United States Patent
Dong et al.

(10) Patent No.: US 9,576,199 B2
(45) Date of Patent: Feb. 21, 2017

(54) METHOD AND DEVICE FOR CALCULATING NUMBER AND MOVING DIRECTION OF PEDESTRIANS

(71) Applicant: ZTE Corporation, Shenzhen, Guangdong (CN)

(72) Inventors: Zhenjiang Dong, Shenzhen (CN); Shengmei Luo, Shenzhen (CN); Feng Liu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/648,030

(22) PCT Filed: Sep. 17, 2013

(86) PCT No.: PCT/CN2013/083687
§ 371 (c)(1),
(2) Date: May 28, 2015

(87) PCT Pub. No.: WO2014/082480
PCT Pub. Date: Jun. 5, 2014

(65) Prior Publication Data
US 2015/0310275 A1 Oct. 29, 2015

(30) Foreign Application Priority Data
Nov. 28, 2012 (CN) .......................... 2012 1 0495159

(51) Int. Cl.
*G06K 9/00* (2006.01)
*G06T 7/20* (2006.01)
(Continued)

(52) U.S. Cl.
CPC ....... *G06K 9/00624* (2013.01); *G06K 9/00778* (2013.01); *G06K 9/4604* (2013.01);
(Continued)

(58) Field of Classification Search
CPC G06K 9/00624; G06K 9/6201; G06K 9/4604; G06K 9/52; G06K 9/4642; G06K 9/00778; G06T 7/2033; G06T 2207/30242; G06T 2207/30232; G06T 2207/30196; G06T 2207/10016
(Continued)

(56) References Cited

U.S. PATENT DOCUMENTS 7,778,466 B1 8/2010 Medasani et al.
2010/0021009 A1 1/2010 Yao
(Continued)

FOREIGN PATENT DOCUMENTS

CN 101404086 A 4/2009
CN 101976353 A 2/2011
(Continued)

OTHER PUBLICATIONS

"People Counting System in Crowded Scenes Based on Feature Regression", Hajer Fradi, Jean-Luc Dugelay, 20th European Signal Processing Conference (EUSIPCO 2012), p. 136-140, Bucharest, Romania, Aug. 27-31, 2012, mailed on Aug. 31, 2012.
(Continued)

*Primary Examiner* — Siamak Harandi
*Assistant Examiner* — Amandeep Saini
(74) *Attorney, Agent, or Firm* — Oppedahl Patent Law Firm LLC

(57) ABSTRACT

A method for calculating the number and moving direction of pedestrians is provided. in which feature points of a current frame image are extracted; the feature points of the current frame image are compared with those of a selected historical frame image, to obtain moving feature points of the current frame image; directional weighted counting is performed on the moving feature points of the current frame image to obtain the moving direction of the pedestrians; and
(Continued)

edge points of pedestrian images are extracted from a foreground image of the current frame image, and performing joint weighted counting on the edge points of the pedestrian images and the moving feature points of the current frame image according to correction coefficients of locations of the respective points, to obtain the number of the pedestrians. A device for calculating the number and moving direction of pedestrians is also provided.

8 Claims, 1 Drawing Sheet

(51) Int. Cl.
G06K 9/46 (2006.01)
G06K 9/52 (2006.01)
G06K 9/62 (2006.01)
(52) U.S. Cl.
CPC ............ *G06K 9/4642* (2013.01); *G06K 9/52* (2013.01); *G06K 9/6201* (2013.01); *G06T 7/2033* (2013.01); *G06T 2207/10016* (2013.01); *G06T 2207/30196* (2013.01); *G06T 2207/30232* (2013.01); *G06T 2207/30242* (2013.01)
(58) Field of Classification Search
USPC ........................................................ 382/103
See application file for complete search history.

(56) References Cited

U.S. PATENT DOCUMENTS

| | | |
|---|---|---|
| 2011/0026598 A1 | 2/2011 | Takada |
| 2012/0155707 A1* | 6/2012 | Kawano ............ G06K 9/00342 382/103 |

FOREIGN PATENT DOCUMENTS

| | | |
|---|---|---|
| CN | 101976353 B | 8/2012 |
| CN | 102750710 A | 10/2012 |

OTHER PUBLICATIONS

"A Method for Counting People in Crowded Scenes", << 2010 Seventh IEEE International Conference on Advanced video and Signal Based Surveillance>>, p. 225-232, D. Conte, P. Foggia, G. Percannella, F. Tufano and M. Vento Dipartimento di Ingegneria dell'Informazione ed Ingegneria Elettrica Universit'a di Salerno Via Ponte don Melillo, I-84084 Fisciano (SA), Italy, mailed on Sep. 1, 2010.

Real-time people counting system,<<China Image and Graphics>> vol. 16, No. 5, He Peng, Ma Wenhua, Huang Lei, Liu Changping, mailed on May 16, 2011.

International Search Report in international application No. PCT/CN2013/083687, mailed on Dec. 26, 2013.

English Translation of the Written Opinion of the International Search Authority in international application No. PCT/CN2013/083687, mailed on Dec. 26, 2013.

Supplementary European Search Report in European application No. 13857870.3, mailed on Oct. 26, 2016.

Teixeira T et al: "Lightweight People Counting and Localizing for Easily Deployable Indoors WSNs", IEEEJournal of Selected Topics in Signal Processing, IEEE, US, vol. 2, No. 4, Sep. 17, 2G08 (Sep. 17, 2008), pp. 493-502, XP011235072,ISSN: 1932-4553, D0I:10. 11G9/JSTSP.2G08.2001426.

"Computer Engineering and Applications",An Improved Moving Target Detection Method,Huifeng Yang et al,mailed on Aug. 4, 2011.

* cited by examiner

METHOD AND DEVICE FOR CALCULATING NUMBER AND MOVING DIRECTION OF PEDESTRIANS

TECHNICAL FIELD

The disclosure relates to an intelligent video monitoring technology, and in particular to a method and device for calculating the number and moving direction of pedestrians.

BACKGROUND

Along with the development of the economic society, the continuous increase of social activities of people and particularly the promotion of an urbanization process, urban population density increases. Therefore, population density estimation has a broad application prospect and high research value.

At present, a population density estimation method is to acquire images for a certain time period by virtue of intelligent video monitoring equipment, analyze the acquired images to obtain multiple image features and establish a regression model by virtue of the obtained image features; and during the real-time monitoring of the intelligent video monitoring equipment, a current frame image is analyzed to obtain an individual feature of the current frame image as an input, the number of people is calculated by virtue of the regression model, and then population density is calculated by virtue of the number of the people.

However, in the population density estimation method, when the regression model is established and the number of the people is calculated, there are many image features to be extracted, which may increase complexity in calculation and cause influence on a calculation speed; and moreover, during intelligent video monitoring, angle influence on an erection position of the monitoring equipment is not taken into account, so that the established regression model is not so accurate when the extracted image features are directly used for analysis, which further causes inaccuracy of the number of the people calculated by virtue of the regression model.

It can be seen that the population density estimation method in an existing technology is lower in calculation speed, and moreover, calculation results are inaccurate.

SUMMARY

In view of this, the disclosure provides a method and device for calculating the number and moving direction of pedestrians, which can increase a calculation speed and improve the accuracy of calculation results.

An embodiment of the disclosure provides a method for calculating the number and moving direction of pedestrians, the method including:

extracting feature points from a current frame image;

comparing the feature points of the current frame image with those of a selected historical frame image to obtain moving feature points of the current frame image;

performing directional weighted counting on the moving feature points of the current frame image to obtain the moving direction of the pedestrians; and extracting edge points of pedestrian images from a foreground image of the current frame image, and performing joint weighted counting on the edge points of the pedestrian images and the moving feature points of the current frame image to obtain the number of the pedestrians according to correction coefficients of locations of the respective edge points.

In an embodiment, the step of comparing the feature points of the current frame image with those of the selected historical frame image to obtain the moving feature points of the current frame image includes:

extracting each of the feature points of the current frame image;

selecting, around the feature points, template images;

selecting, from the selected historical frame image around locations corresponding to the feature points of the current frame image, search images;

searching the search images by virtue of the template images for points matched with the feature points;

judging a location relation between each feature point and its matched point; and when a distance between the feature point and the matched point is greater than a set threshold, determining that the feature point of the current frame image is a moving feature point; and repeating the judging and determining steps until all the moving feature points in the current frame image and their moving directions are obtained.

In an embodiment, the steps of performing directional weighted counting on the moving feature points of the current frame image and obtaining the moving direction of the pedestrians include:

for each moving feature point, finding out a correction coefficient corresponding to a location of the moving feature point as a weight of the moving feature point; and summing weights of all the moving feature points of the current frame image by taking account of their respective directions to obtain a moving histogram of the current frame image, and updating a moving histogram historical record with the obtained moving histogram of the current frame image; and counting all the moving feature points in each direction according to the moving histogram historic record respectively, and calculating a ratio of the total number of the moving feature points in each direction to the total number of the moving feature points to obtain a historic moving histogram; performing binarization on the historic moving histogram to obtain a moving direction record of the current frame image, and updating the moving direction historic record with the moving direction record; and obtaining the final number of the moving feature points in each direction according to the moving direction historic record, and taking a direction in which the number of the moving feature points exceeds a preset moving threshold as the moving direction of the pedestrians.

In an embodiment, the step of performing joint weighted counting on the edge points of the pedestrian images and the moving feature points of the current frame image to obtain the number of the pedestrians according to the correction coefficients of the locations includes: for each edge point of the pedestrian images and each moving feature point of the current frame image, finding out a preset correction coefficient according to a location of the point; and summing all the correction coefficients corresponding to the edge points of the pedestrian images and the moving feature points of the current frame image, and taking the sum as the number of the pedestrians.

An embodiment of the disclosure further provides a device for calculating the number of pedestrians and a moving direction, the device including: an image acquisition module, a moving direction calculation module and a pedestrian number calculation module, the image acquisition module is configured to provide a current frame image for the moving direction calculation module and the pedestrian number calculation module;

the moving direction calculation module is configured to extract feature points of the current frame image, compare the feature points of the current frame image with those of a selected historical frame image to obtain moving feature points of the current frame image, and perform directional weighted counting on the moving feature points of the current frame image to obtain the moving direction of pedestrians; and the pedestrian number calculation module is configured to extract edge points of pedestrian images from a foreground image of the current frame image, and perform joint weighted counting on the edge points of the pedestrian images and the moving feature points of the current frame image to obtain the number of the pedestrians according to correction coefficients of locations of the respective edge points.

In an embodiment, the moving direction calculation module is configured to extract each of the feature points of the current frame image, and select around the feature points template images; select from the selected historical frame image around locations corresponding to the feature points of the current frame image search images; and search the search images by virtue of the template images for points matched with the feature points, judge a location relation between each feature point and its matched point, and a distance between the feature point and the matched point is greater than a set threshold, determine that the feature point of the current frame image is a moving feature point; and repeat the judging and determining steps until all the moving feature points in the current frame image and their moving directions are obtained.

In an embodiment, the moving direction calculation module is configured to, for each moving feature point, find out a correction coefficient corresponding to a location of the moving feature point as a weight of the moving feature point, sum weights of all the moving feature points of the current frame image by taking account of their respective directions to obtain a moving histogram of the current frame image, update a moving histogram historical record with the obtained moving histogram of the current frame image, count all the moving feature points in each direction according to the moving histogram historic record respectively, calculate a ratio of the total number of the moving feature points in each direction to the total number of the moving feature points to obtain a historic moving histogram, perform binarization on the historic moving histogram to obtain a moving direction record of the current frame image, update the moving direction historic record with the moving direction record, obtain the final number of the moving feature points in each direction according to the moving direction historic record, and take a direction in which the number of the moving feature points exceeds a preset moving threshold as the moving direction of the pedestrians.

In an embodiment, the pedestrian number calculation module is configured to, for each edge point of the pedestrian images and each moving feature point of the current frame image, find out a preset correction coefficient according to a location of the point; and sum all the correction coefficients corresponding to the edge points of the pedestrian images and the moving feature points of the current frame image, and taking the sum as the number of the pedestrians.

According to the method and device for calculating the number of the pedestrians and the moving direction of the pedestrians provided by the embodiment of the disclosure, the moving direction of the pedestrians can be obtained by performing weighted counting on the moving feature points of the current frame image; and the number of the pedestrians can be obtained by performing joint weighted counting on the edge points of the pedestrian images and the moving feature points of the current frame image according to the correction coefficients of the locations. In such a manner, compared with the existing technology, the disclosure has the advantages that the moving direction of the pedestrians and the number of the pedestrians can be obtained by virtue of fewer image features, so that the calculation speed is increased; and moreover, the correction coefficients are adopted for weighted counting in a calculation process, so that different shooting angles and distances of monitoring equipment can be compensated during calculation, and more accurate final results can be obtained.

DETAILED DESCRIPTION

According to the embodiment of the disclosure, feature points of a current frame image are extracted, and the feature points of the current frame image are compared with those of a selected historic frame image to obtain moving feature points of the current frame image; weighted counting is directionally performed on the moving feature points of the current frame image to obtain a moving direction of a pedestrians; and edge points of pedestrian images are extracted from a foreground image of the current frame image, and joint weighted counting is performed on the edge points of the pedestrian images and the moving feature points of the current frame image to obtain the number of pedestrians according to correction coefficients of locations.

The subject matter of the disclosure is further described below with reference to the drawings and specific embodiments in detail.

Figure 1:
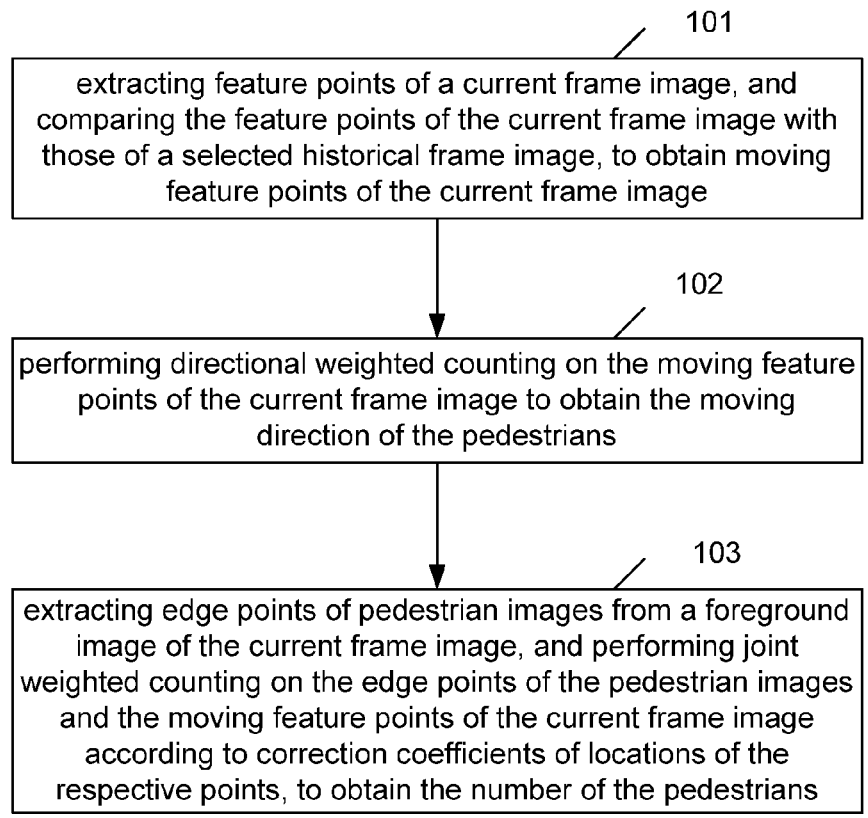
FIG. 1 is a flowchart of a method for calculating the number of pedestrians and a moving direction of a pedestrians according to an embodiment of the disclosure.

The embodiment of the disclosure proposes a method for calculating the number of pedestrians and a moving direction of a pedestrians. As shown in FIG. 1, the method includes the following steps:

Step 101: feature points of a current frame image are extracted, and compared with those of a selected historical frame image to obtain moving feature points of the current frame image.

Here, the current frame image is extracted according to the existing technology, a detection area is set, and an image in the detection area is extracted as the current frame image.

The method for extracting the feature points of the current frame image is an existing technology, a Speeded Up Robust Feature (SURF) algorithm may be adopted, parameter settings adopt default settings, the number of the feature points of the image is set according to an actual condition, and a specific calculation method will not be described here.

The step of comparing the feature points of the current frame image with the selected historical frame image to obtain the moving feature points of the current frame image includes: extracting the feature points of the current frame image one by one, and selecting around the feature points images with a size of N*M as template images T; selecting from the selected historical frame image around locations corresponding to the feature points of the current frame image images with a size W*H as search images S; searching the search images S by virtue of the template images T for points matched with the feature points, judging a location relation between each feature point and its matched point, and when a distance between the feature point and the matched point is greater than a set threshold, determining that the feature point of the current frame image is a moving feature point; and by such analogy, obtaining all the moving feature points in the current frame image and their moving directions. The set threshold is set as desired and will not be described here.

The selected historic frame image is a certain frame image before the current frame image, which is selected according to an actual setting, and for example, the selected historic frame image may be set to be an image five frames before the current frame image, or is set to be an image ten frames before the current frame image; and the search images S are larger than the template images T, that is, W is greater than N and H is greater than M.

The step of searching the search images S by virtue of the template images T for points matched with the feature points may include: sequentially selecting local images as large as the template images T from the search images S according to a specified sequence, calculating an absolute error sum of the local images and the template images T, and when the absolute error sum is smaller than a preset match threshold, taking centre points of the local images as the matched points of the search images S.

The step of determining a location relation between each feature point and its matched point may include: calculating displacement of the matched point relative to the feature point, judging whether the displacement is smaller than a preset moving threshold or not, determining that the corresponding feature point is a moving feature point if YES, otherwise determining that the feature point is not a moving feature point.

The match threshold and the moving threshold are numerical values preset according to an actual condition; and a formula for calculating the absolute error sum of the local images and the template images T is:

$$E(i, j) = \sum_{m=1}^{M} \sum_{n=1}^{N} |S^{ij}(m, n) - T(m, n)|,$$

wherein E(i,j) represents the absolute error sum, and (i,j) represents relative locations of the template images T in the search images S.

Step 102: directional weighted counting is performed on the moving feature points of the current frame image to obtain the moving direction of the pedestrians.

Here, the step of performing directional weighted counting on the moving feature points of the current frame image may include: for each moving feature point, finding out a correction coefficient corresponding to a location of the moving feature point as a weight of the moving feature point; and summing weights of all the moving feature points of the current frame image by taking account of their respective directions to obtain a moving histogram of the current frame image. The correction coefficients are correction values preset for the respective feature points.

The step of obtaining the moving direction of the pedestrians may include: adding the moving histogram of the current frame image into a moving histogram historic record; counting all the moving feature points in each direction according to the moving histogram historic record respectively, and calculating a ratio of the total number of the moving feature points in each direction to the total number of the moving feature points to obtain a historic moving histogram; performing binarization on the historic moving histogram to obtain a moving direction record of the current frame image, and updating the moving direction historic record with the moving direction record; and obtaining the final number of the moving feature points in each direction according to the moving direction historic record, and taking the direction in which the number of the moving feature points exceeds the preset moving threshold as the moving direction of the pedestrians.

The method for acquiring the moving histogram is an existing technology, and will not be described here; the moving histogram historic record is a set formed by a specified number of stored moving histograms; and the specified number is specified according to an actual condition, and for example, 50 moving histograms may be specified to be stored.

For example, if the moving histogram of the current frame image is H[8], the moving histogram historic record includes 50 moving histograms, and is represented as HH[8][50].

In the step of counting all the moving feature points in each direction according to the moving histogram historic record respectively, and calculating the ratio of the total number of the moving feature points in each direction to the total number of the moving feature points to obtain the historic moving histogram, the following formula may be adopted:

$$S[n] = \frac{\sum_{j=1}^{50} HH[n][j]}{\sum_{i=1}^{8} \sum_{j=1}^{50} HH[i][j]},$$

in which S[n] represents the historic moving histogram, and n represents one of eight directions.

In the step of performing binarization on the historic moving histogram to obtain the moving direction record of the current frame image, the following formula may be adopted:

$$D[n] = \begin{cases} 1, & \frac{S[n]}{\sum_{i=1}^{8} S[i]} \rangle \frac{1}{8} \\ 0, & \text{others} \end{cases},$$

in which D[n] represents the moving direction record of the current frame image, and n represents one of eight directions.

In the step of obtaining the final number of the moving feature points in each direction according to the moving direction historic record, the following formula may be adopted:

$$C[n] = \sum_{j=1}^{50} HS[n][j],$$

in which C[n] represents the final number in each direction, HS[n][j] represents the moving direction historic record, and is a set formed by a specified number of stored moving direction records, n represents one of eight directions, and j represents the stored moving direction record.

Step 103: edge points of pedestrian images are extracted from a foreground image of the current frame image, and joint weighted counting is performed on the edge points of the pedestrian images and the moving feature points of the current frame image to obtain the number of the pedestrians according to the correction coefficients of the locations of the respective edge points.

Here, the foreground image of the current frame image may be processed as follows: a background image and the foreground image are obtained by virtue of a Gaussian mixture background modelling algorithm, and the foreground image is corrected.

The Gaussian mixture background modelling algorithm is an existing technology, and will not be described here; and morphological filtering, in combination with integral-image-based foreground confidence calculation can be adopted for the correction of the foreground image, which is an existing technology, and will not be described here.

The step of extracting the edge points of the pedestrian images includes: performing Canny edge detection on the current frame image to obtain initial edge images, and performing AND operation on the initial edge images and the foreground image of the current frame image to obtain corrected pedestrian edge images; and counting edge points in the corrected pedestrian edge images to finally obtain the edge points of the pedestrian images.

The step of performing joint weighted counting on the edge points of the pedestrian images and the moving feature points of the current frame image to obtain the number of the pedestrians according to the correction coefficients of the locations of the respective edge points may include: for each edge point of the pedestrian images and each moving feature point of the current frame image, finding out a preset correction coefficient according to a location of the point; and summing all the correction coefficients corresponding to the edge points of the pedestrian images and the moving feature points of the current frame image, and taking the sum as the number of the pedestrians.

Figure 2:
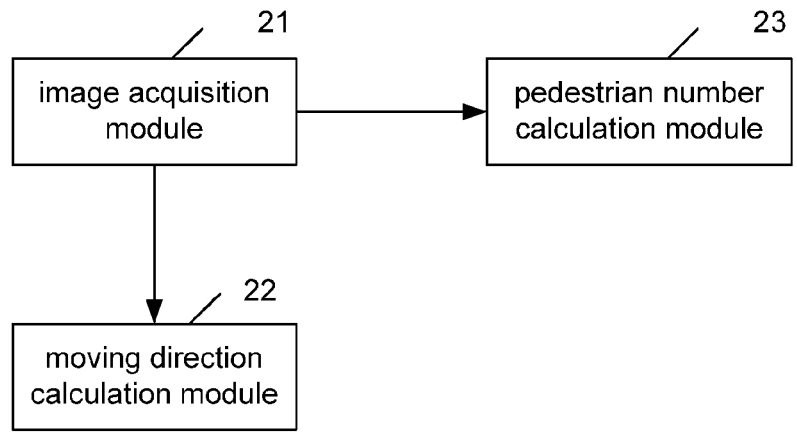
FIG. 2 is a structure diagram of a device for calculating the number of pedestrians and a moving direction of a pedestrians according to an embodiment of the disclosure.

As shown in FIG. 2, the embodiment of the disclosure provides a device for calculating the number of pedestrians and a moving direction of a pedestrians, the device including: an image acquisition module 21, a moving direction calculation module 22 and a pedestrian number calculation module 23.

The image acquisition module 21 is configured to provide a current frame image for the moving direction calculation module 22 and the pedestrian number calculation module 23.

The moving direction calculation module 22 is configured to extract feature points of the current frame image from the image acquisition module 21, compare the feature points of the current frame image with a selected historical frame image to obtain moving feature points of the current frame image, and directionally perform weighted counting on the moving feature points of the current frame image to obtain the moving direction of the pedestrians.

The pedestrian number calculation module 23 is configured to extract edge points of pedestrian images from a foreground image of the current frame image stored in the image acquisition module 21, and perform joint weighted counting on the edge points of the pedestrian images and the moving feature points of the current frame image to obtain the number of the pedestrians according to correction coefficients of locations.

The image acquisition module 21 is configured to set a detection area, and extract an image in the detection area as the current frame image.

The moving direction calculation module 22 is configured as follows: a SURF algorithm may be adopted, parameter settings adopt default settings, the number of the feature points of the image is set according to an actual condition, and specific calculation will not be described here.

The moving direction calculation module 22 is configured to extract each of the feature points of the current frame image, and select images with sizes of N*M as template images T around the extracted feature points; select images with sizes W*H as search images S around locations corresponding to the feature points of the current frame image from the selected historical frame image; search the search images by virtue of the template images for points matched with the feature points, judge a location relation between each feature point and its matched point, and a distance between the feature point and the matched point is greater than a set threshold, determine that the feature point of the current frame image is a moving feature point; and repeat the judging and determining steps until all the moving feature points in the current frame image and their moving directions are obtained.

The moving direction calculation module 22 is configured to select a certain frame image before the current frame image according to an actual setting as the historic frame image, and for example, may be configured to select an image five frames before the current frame image, or may be configured to select an image ten frames before the current frame image.

The moving direction calculation module 22 is configured to sequentially select local images as large as the template images T from the search images S according to a specified sequence, calculate an absolute error sum of the local images and the template images T, and when the absolute error sum is smaller than a preset match threshold, take centre points of the local images as the matched points of the search images S; and calculate relative displacement of the matched points and the feature points, judge whether the relative displacement is smaller than a preset moving threshold or not, determine that the corresponding feature points are moving feature points if YES, otherwise determine that the feature points are not moving feature points;

wherein, a formula for calculation is:

$$E(i, j) = \sum_{m=1}^{M} \sum_{n=1}^{N} |S^{ij}(m, n) - T(m, n)|,$$

in which E(i,j) represents the absolute error sum, and (i,j) represents relative locations of the template images T in the search images S.

The moving direction calculation module 22 is configured to for each moving feature point, find out a correction coefficient corresponding to a location of the moving feature point as a weight of the moving feature point; and sum weights of all the moving feature points of the current frame image by taking account of their respective directions to obtain a moving histogram of the current frame image.

The moving direction calculation module 22 is configured to update a moving histogram historic record with the moving histogram of the current frame image; count all the moving feature points in each direction according to the moving histogram historic record respectively, and calculate a ratio of the total number of the moving feature points in each direction to the total number of the moving feature points to obtain a historic moving histogram; perform binarization on the historic moving histogram to obtain a moving direction record of the current frame image, and update the moving direction historic record with the moving direction record; and obtain the final number of the moving feature points in each direction according to the moving direction historic record, and take the direction in which the number of the moving feature points exceeds the preset moving threshold as the moving direction of the pedestrians. The method for acquiring the moving histogram is an existing technology, and will not be described here;

the moving histogram historic record is a set formed by a specified number of stored moving histograms; the specified number is specified according to an actual condition, and for example, 50 moving histograms may be specified to be stored; for example: if the moving histogram of the current frame image is H[8], the moving histogram historic record includes 50 moving histograms, and is represented as HH[8][50];

in the step of counting all the moving feature points in each direction according to the moving histogram historic record respectively, and calculating the ratio of the total number of the moving feature points in each direction to the total number of the moving feature points to obtain the historic moving histogram, the following formula may be adopted:

$$S[n] = \frac{\sum_{j=1}^{50} HH[n][j]}{\sum_{i=1}^{8}\sum_{j=1}^{50} HH[i][j]},$$

in which S[n] represents the historic moving histogram, and n represents one of eight directions;

in the step of performing binarization on the historic moving histogram to obtain the moving direction record of the current frame image, the following formula may be adopted:

$$D[n] = \begin{cases} 1, & \frac{S[n]}{\sum_{i=1}^{8} S[i]} \rangle \frac{1}{8} \\ 0, & others \end{cases},$$

in which D[n] represents the moving direction record of the current frame image, and n represents one of eight directions; and in the step of obtaining the final number of the moving feature points in each direction according to the moving direction historic record, the following formula may be adopted:

$$C[n] = \sum_{j=1}^{50} HS[n][j],$$

in which C[n] represents the final number in each direction, HS[n][j] represents the moving direction historic record, and is a set formed by a specified number of stored moving direction records, n represents one of eight directions, and j represents the stored moving direction record.

The pedestrian number calculation module 23 is configured to obtain a background image and the foreground image by virtue of a Gaussian mixture background modelling algorithm, and correct the foreground image, wherein the Gaussian mixture background modelling algorithm is an existing technology, and will not be described here; morphological filtering is used in combination with integral-image-based foreground confidence calculation for the correction of the foreground image, which is an existing technology, and will not be described here; and the pedestrian number calculation module 23 is configured to perform Canny edge detection on the current frame image to obtain initial edge images, and perform AND operation on the initial edge images and the foreground image of the current frame image to obtain corrected pedestrian edge images; and count edge points in the corrected pedestrian edge images to finally obtain the edge points of the pedestrian images.

The pedestrian number calculation module 23 is configured to, for each edge point of the pedestrian images and each moving feature point of the current frame image, find out a preset correction coefficient according to a location of the point; and sum all the correction coefficients corresponding to the edge points of the pedestrian images and the moving feature points of the current frame image, and taking the sum as the number of the pedestrians.

The image acquisition module may be implemented by virtue of a camera, and the moving direction calculation module and the pedestrian number calculation module may be implemented by virtue of a processor, such as a Central Processing Unit (CPU).

The above is only the preferred embodiment of the disclosure and not intended to limit the scope of protection of the disclosure.

What is claimed is:

1. A method for calculating a number and moving direction of pedestrians, comprising:
   step A: extracting feature points of a current frame image;
   step B: comparing the feature points of the current frame image with those of a selected historical frame image, to obtain moving feature points of the current frame image; and
   step C: performing directional weighted counting on the moving feature points of the current frame image to obtain the moving direction of the pedestrians,
   wherein the step of comparing the feature points of the current frame image with those of the selected historical frame image to obtain the moving feature points of the current frame image comprises:
   step a: extracting each of the feature points of the current frame image;
   step b: selecting, around the feature points, template images;
   step c: selecting, from the selected historical frame image around locations corresponding to the feature points of the current frame image, search images;
   step d: searching the search images by virtue of the template images for points matched with the feature points;
   step e: judging a location relation between each feature point and its matched point; and step f: when a distance between the feature point and the matched point is greater than a set threshold, determining that the feature point of the current frame image is a moving feature point; and repeating the steps e and f until all the moving feature points in the current frame image and their moving directions are obtained.

2. The method according to claim 1, wherein the step of performing directional weighted counting on the moving feature points of the current frame image to obtain the moving direction of the pedestrians comprises:

for each moving feature point, finding out a correction coefficient corresponding to a location of the moving feature point as a weight of the moving feature point, summing the weights of all the moving feature points of the current frame image by taking account of their respective directions to obtain a moving histogram of the current frame image, and updating a moving histogram historical record with the obtained moving histogram of the current frame image; and counting all the moving feature points in each direction according to the moving histogram historic record respectively, calculating a ratio of a total number of the moving feature points in each direction to a total number of the moving feature points to obtain a historic moving histogram, performing binarization on the historic moving histogram to obtain a moving direction record of the current frame image, and updating the moving direction historic record with the moving direction record, obtaining a final number of the moving feature points in each direction according to the moving direction historic record, and taking a direction in which the number of the moving feature points exceeds a preset moving threshold as the moving direction of the pedestrians.

3. The method according to claim 1, further comprising: extracting edge points of pedestrian images from a foreground image of the current frame image, and performing joint weighted counting on the edge points of the pedestrian images and the moving feature points of the current frame image according to correction coefficients of locations of the respective points, to obtain the number of the pedestrians.

4. The method according to claim 3, wherein the step of performing joint weighted counting on the edge points of the pedestrian images and the moving feature points of the current frame image to obtain the number of the pedestrians according to the correction coefficients of the locations comprises: for each) edge point of the pedestrian images and each moving feature point of the current frame image, finding out a preset correction coefficient according to a location of the point; and summing all the correction coefficients corresponding to the edge points of the pedestrian images and the moving feature points of the current frame image, and taking the sum as the number of the pedestrians.

5. A device for calculating the number and moving direction of pedestrians, comprising: an image acquisition module and a moving direction calculation module, wherein the image acquisition module is configured to provide a current frame image for the moving direction calculation module and the pedestrian number calculation module; and wherein the moving direction calculation module is configured to step A: extract feature points of the current frame image, step B: compare the feature points of the current frame image with those of a selected historical frame image to obtain moving feature points of the current frame image, and step C: perform directional weighted counting on the moving feature points of the current frame image to obtain the moving direction of pedestrians, wherein the moving direction calculation module is configured to:

step a: extract each of the feature points of the current frame image;

step b: select around the feature points template images;

step c: select from the selected historical frame image around locations corresponding to the feature points of the current frame image search images;

step d: search the search images by virtue of the template images for points matched with the feature points;

step e: judge a location relation between each feature point and its matched point;

step f: when a distance between the feature point and the matched point is greater than a set threshold, determine that the feature point of the current frame image is a) moving feature point; and repeat the steps e and f until all the moving feature points in the current frame image and their moving directions are obtained.

6. The device according to claim 5, wherein the moving direction calculation module is configured to, for each moving feature point, find out a correction coefficient corresponding to a location of the moving feature point as a weight of the moving feature point, sum the weights of all the moving feature points of the current frame image by taking account of their respective directions to obtain a moving histogram of the current frame image, update a moving histogram historical record with the obtained moving histogram of the current frame image, count all the moving feature points in each direction according to the moving histogram historic record respectively, calculate a ratio of a total number of the moving feature points in each direction to a total number of the moving feature points to obtain a historic moving histogram, perform binarization on the historic moving histogram to obtain a moving direction record of the current frame image, update the moving direction historic record with the moving direction record, obtain a final number of the moving feature points in each direction according to the moving direction historic record, and take a direction in which the number of the moving feature points exceeds a preset moving threshold as the moving direction of the pedestrians.

7. The device according to claim 5, further comprising:

a pedestrian number calculation module, configured to extract edge points of pedestrian images from a foreground image of the current frame image, and perform joint weighted counting on the edge points of the pedestrian images and the moving feature points of the current frame image according to correction coefficients of) locations of the respective edge points, to obtain the number of the pedestrians.

8. The device according to claim 7, wherein the pedestrian number calculation module is configured to, for each edge point of the pedestrian images and each moving feature point of the current frame image, find out a preset correction coefficient according to a location of the point; and sum all the correction coefficients corresponding to the edge points of the pedestrian images and the moving feature points of the current frame image, and taking the sum as the number of the pedestrians.

\* \* \* \* \*